April 24, 1945. D. G. C. HARE 2,374,197
BORE HOLE LOGGING METHOD AND APPARATUS
Filed Jan. 15, 1942 2 Sheets-Sheet 1
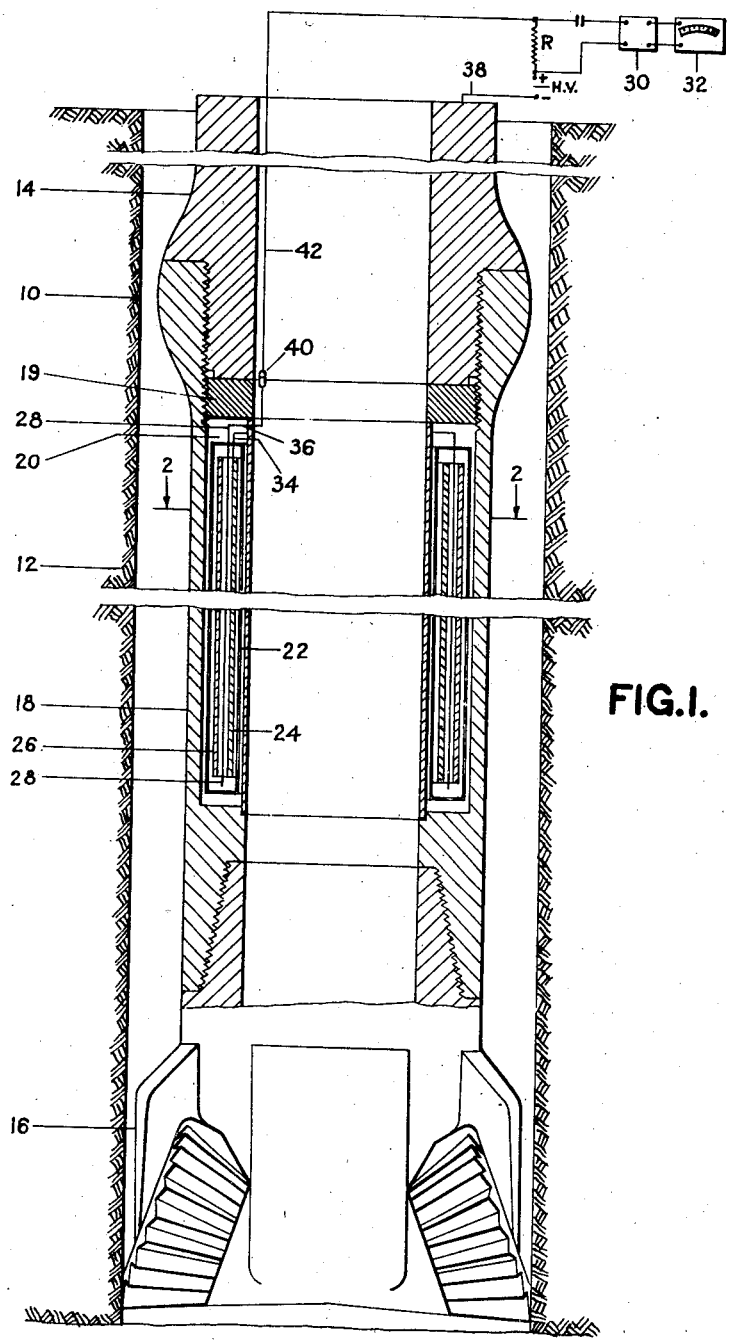
FIG.I.
D.G.C.HARE
INVENTOR
BY
HIS ATTORNEYS.

April 24, 1945.   D. G. C. HARE   2,374,197
BORE HOLE LOGGING METHOD AND APPARATUS
Filed Jan. 15, 1942   2 Sheets-Sheet 2

D.G.C.HARE
INVENTOR

BY

HIS ATTORNEYS.

Patented Apr. 24, 1945

2,374,197

UNITED STATES PATENT OFFICE 2,374,197

BOREHOLE LOGGING METHOD AND APPARATUS

Donald G. C. Hare, New York, N. Y., assignor to Texaco Development Corporation, New York, N. Y., a corporation of Delaware Application January 15, 1942, Serial No. 426,837

7 Claims. (Cl. 250—83.6)

This invention relates to the logging of bore holes and more particularly to a method and an apparatus by means of which the earth formations being drilled can be identified during the drilling operation.

The principal object of the invention is to provide a method and an apparatus which will furnish a continuous, accurate log of the strata being penetrated by the drill bit without in any manner interfering with the circulation of drilling fluid or any of the other operations attendant to the drilling of the hole.

Various methods have been proposed for logging holes which have previously been drilled, but these methods cannot, generally, be carried on during the drilling operation. Although certain suggestions have been made for logging the formations while a hole is being drilled, these have not been too successful for various reasons. In the electrical logging methods where the drill bit serves as one electrode, it has been found very difficult to insulate electrically the bit from the drill string without materially reducing the strength of the connection between the bit and the pipe. Again in the electric logging methods it is usually essential that a good electrical connection be made between an electrode which, as stated, may be the drill bit, and an instrument or apparatus at the surface. It is, of course, difficult if not almost impossible to pass a continuous electric cable upwardly from the drill bit to the surface through the pipe string and, as an alternative, it has been proposed to secure within each section of pipe a length of cable corresponding to the length of the pipe section and then to make electrical connections between adjacent ends of these cable sections while the pipe string is being made up. Again, it is extremely difficult to make and maintain these electrical connections tight, and in case a loose connection should be caused, as by vibration or corrosion, the additional electrical resistance placed in the circuit by this poor connection might render the readings inaccurate. It is, of course, desirable that any logging instrument be so placed in connection with the drill bit that there will be no additional interference to the passage of the drilling fluid through the pipe string and bit.

In accordance with the present invention, the radioactivity of the earth formations in close proximity to the drilling bit can be continuously logged and a record obtained at the surface. It is not necessary to stop the drilling operation in order to take the readings, nor is any instrument or obstruction placed in the normal path of the drilling fluid which would interfere with the proper flow of that fluid.

In carrying out the invention a detector of penetrative radiation is mounted within a section of pipe preferably connected in the drill pipe string immediately above the drill bit. The detector is of a type having a very high efficiency as compared with the conventional Geiger-Muller counter and is formed in a cylindrical shape so that it can be mounted within an annular chamber in the special drill pipe section. The detector is connected electrically with a suitable source of high electrical potential and with an indicating and recording device at the surface. During the rotation of the drill string the instrument at the surface will record the number of counts registered by the detector, and since the amount of radiation picked up by the detector will vary as different strata are encountered and penetrated by the drill bit, a record will be had of the nature of these strata which, when correlated with the depth of the drill bit and detector, will indicate the position of the formations penetrated.

In my co-pending patent application filed November 2, 1940, serial No. 364,020, and in my copending application, Serial Number 426,838, filed concurrently herewith, there are disclosed devices for detecting penetrative radiation, such as gamma rays, which devices have efficiencies many times that of the devices known to the prior art. In one embodiment of the detector disclosed in application Serial Number 364,020, the instrument is formed of a pair of cylindrical cathode members disposed concentrically within a suitable housing or envelope so that a small space will be left between the two cylinders. A plurality of fine wires are stretched through that space generally parallel to each other and to the cylinders, these wires being connected together electrically to form the anode of the detector. The anode wires positioned in this manner provide the proper type of concentration or inhomogeneity of the field. A high positive potential is connected to the anode and the cathode is grounded. The housing is filled with a suitable gas such as argon under a predetermined pressure, the arrangement being such that a gamma ray entering the detector will strike one or both of the cathode cylinders to eject an electron which will cause ionization of the gas with a consequent discharge of the counter. A recording instrument connected across an electrical resistance in series with the source of potential and the anode will register these discharges and a determination can thus be made of the amount of radioactivity of the substances surrounding the detector. This detector will be described again in connection with the present invention. In the aforementioned co-pending application, Serial Number 426,838, the detector comprises a plurality of annular ring members disposed in separated, parallel relation and connected together electrically to form a cathode. The cathode rings are provided with a plurality of series of aligned holes and a wire is disposed through each series of holes, these wires being connected together to form the anode. The anode and cathode members are housed within an envelope filled with a suitable gas and the operation is similar to that described in the preceding paragraph.

For a better understanding of the invention reference may be had to the accompanying drawings in which Fig. 1 is a sectional elevation through a bore hole showing a string of drill pipe in position to bore the hole and a radiation detector mounted in the pipe close to the drill bit;

Figure 3:
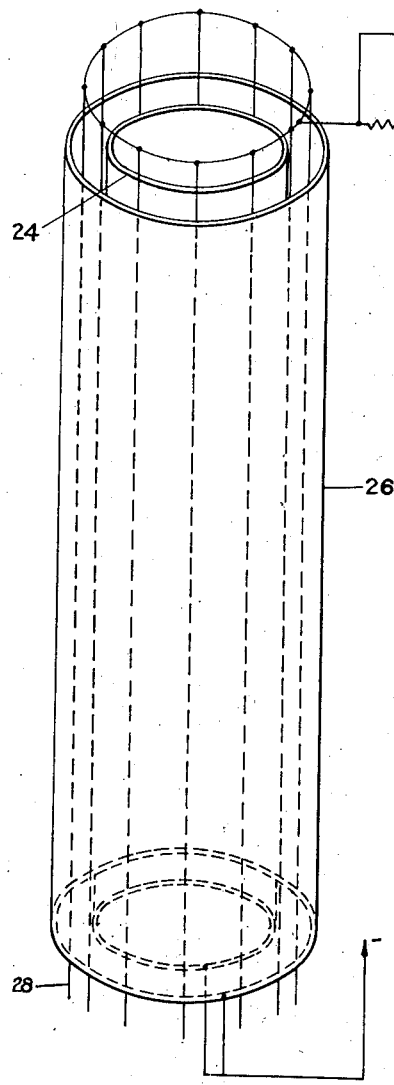
Fig. 3 is a perspective view of the detectors with the housing removed for purposes of simplification.

Referring to the drawings, a hole 10 is shown as having been drilled into the earth formation 12 by means of a drill pipe string 14 at the lower end of which is attached a suitable drilling bit 16. The pipe string is, of course, made up of a plurality of sections of pipe screwed together to form one continuous pipe or drill stem and is adapted to be rotated by means, not shown, at the surface so that the bit 16 will cut away the earth formations. A drilling fluid such as mud is usually circulated down through the pipe string, out at the bit and upwardly to the surface between the drill pipe string and the walls of the hole. In accordance with this invention a special pipe section or sub 18 is connected in the pipe string between the bit 16 and the next upper pipe section, and is provided with a removable insert 19 which, when in place provides an annular chamber 20 adapted to contain the radiation detector.

The detector, as previously disclosed in the aforementioned application, Serial Number 364,020, comprises a housing or envelope 22, annular in shape and sealed so as to contain a suitable gas. Within the housing 22 are disposed a pair of metallic cylinders 24 and 26 connected together electrically, as shown in Fig. 3, so as to form the cathode of the device. The cylinders are disposed concentrically and through the annular space between the cylinders a plurality of wires 28 are mounted, these wires also being connected together electrically to form the anode. An electrical resistance R is connected in series with the source of electrical potential and the anode, and on ionization of the gas within the detector a voltage drop will occur across the resistance R and by means of a suitable amplifier 30 and a recording instrument 32 a record of these discharges or counts can be made. The radiation detector is, as stated above, mounted within the chamber 20 of the pipe section 18 and a lead wire 34 from the cathode is shown as grounded to the metal of the pipe section 18. Another lead 36 from the anode extends upwardly through the pipe string 14 to the surface where it is connected, as described hereinbefore, to an amplifier 30 and a recording instrument 32. The pipe string is connected by means of lead 38 to the negative of the source of potential, the positive of which is connected to the resistance R and the amplifier 30.

Any suitable means for providing the electrical connection from the anode 28 to the surface may be used. The lead 36 from the anode may be connected to one side of a contact device 40 disposed at the joint between the pipe section 18 and the next upper pipe section in such a manner that when the pipe string is made up the electrical contact members 40 at each pipe joint will be joined so that a continuous lead will be provided from the detector to the surface. It is understood that each section of the pipe string could be provided with a length of wire 42 secured in any suitable manner to the inner surface of the pipe and terminating at each end in contact members 40.

In my patent application, Serial Number 410,368, filed September 11, 1941, another method of transmitting signals from an instrument in a bore hole, such as the radiation detector, 22 to the surface is described. In accordance with the disclosure in that application a coupling which may be inductive or electrostatic is provided at each pipe joint and wires extending through the length of each pipe section serve to connect the coupling members at opposite ends of each pipe section. A continuous electrical circuit is thus provided which will serve to conduct electrical signals from the detector in the hole above the drill bit to the proper instrument at the surface.

In operation, assuming that the pipe string 14 is being rotated so that the bit 16 will be cutting away the earth, a gamma ray from the formation 12 passing through the outer portion of the pipe 18 and into the detector within the chamber 20 may strike on of the cathode cylinders 24 or 26 to eject an electron into the gas within the housing 22 to cause ionization of this gas to trip or discharge the detector. This discharge will, as described previously, cause a potential drop across the resistance R and this signal when amplified by means of the device 30 will be recorded at the instrument 32. Since the radioactivity of the formation 12 will, in all probability, be different from that of the adjacent, upper and lower formations, the record obtained at the instrument 32 will indicate the time when the drill bit and the radiation detector pass from one formation into the next lower formation. By correlating this record with the depth at which the bit 16 is cutting at that time, the position of the interface between any two adjacent strata or formations can be readily determined.

Figure 2:
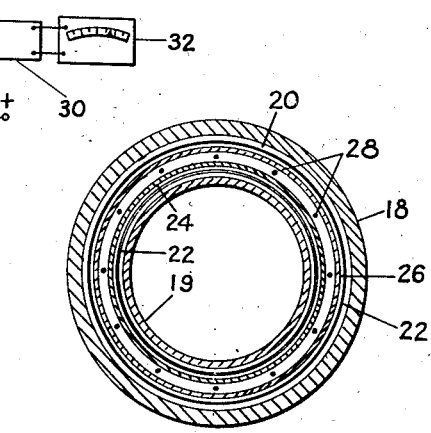
Fig. 2 is a cross-section on the line 2—2 of Fig. 1.
Figure 4:
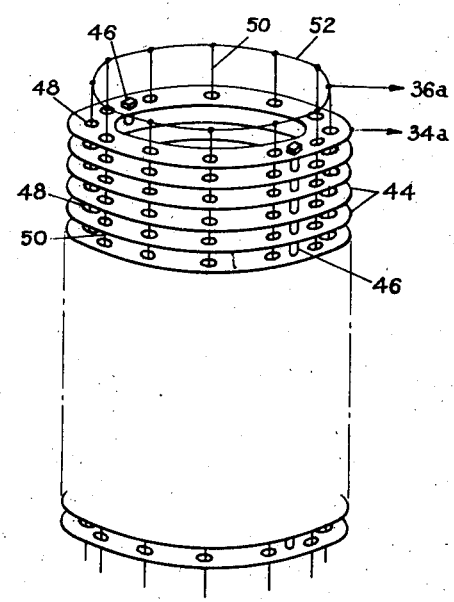
Fig. 4 is a perspective view of another form of detector.

In Fig. 4 is shown another radiation detector which is well suited for use in connection with the well logging method described. A plurality of thin metallic annular rings 44 are mounted on suitable supports such as the bolts 46 in spaced parallel relation and the bank of plates thus comprises the cathode of the device and corresponds to the pair of cylinders 24 and 26 shown in Figs. 1 through 3. Each of the plates 44 is provided with a plurality of holes 48 and the rings or plates are so disposed that the holes will be aligned in serveral series. A wire 50 passes through each series of holes and these wires are connected, as shown diagrammatically at 52, so as to form the anode of the device. The elements so far described are preferably enclosed in a gas filled envelope or housing, not shown, similar to the housing 22 of Fig. 1 and the entire device can then be placed in the chamber 20 of the special pipe section or drill collar 18. A gamma ray striking one of the cathode plates or rings 44 will cause an electron to be ejected into the gas within the housing and ionization of the gas will thus occur with an attendant discharge of the device.

Supporting means for the cathodes and anodes of the detectors shown in Figs. 1 and 4 have been omitted for purposes of simplicity. Where the housings or envelopes 22 are of glass it is common to support the anode wires either directly in the glass itself or by means of small pieces of wire molded into the glass.

Since the radiation detector is mounted entirely within the chamber 20 in the pipe section 18, there will be nothing to obstruct the normal flow of drilling fluid through the interior of the pipe string 14. The special pipe section 18 may be the usual drill collar for connecting the bit 16 to the pipe string 14, which collar has the chamber 14 formed therein to house the radiation detector.

Obviously many modifications and variations of the invention, as hereinbefore set forth, may be made without departing from the spirit and scope thereof and, therefore, only such limitations should be imposed as are indicated in the appended claims.

I claim:

1. The method of forming a well hole which comprises operating a cutting tool so as to penetrate the earth formations, simultaneously measuring the natural radiation of the formation in the immediate vicinity of the cutting tool as the hole is formed, said radiation reaching the hole from all directions in planes intersecting that portion of the well hole in said vicinity, and correlating variations in radioactivity detected with the depth of the cutting tool in the hole.

2. Apparatus for continuously logging a bore hole while it is being drilled comprising a drill pipe string, a drill bit, a drill collar connecting said bit to the lower end of said string, said collar being provided with an annular concentric chamber, and a detector of natural penetrative radiation in said chamber, said detector being cylindrical in shape.

3. Apparatus for continuously logging a bore hole while it is being drilled comprising a drill pipe string, a drill bit, a drill collar connecting said bit to the lower end of said string, said collar being provided with an annular concentric chamber, and a detector of penetrative radiation in said chamber, said detector comprising a pair of separated concentric cylindrical cathode members and a plurality of anode wires extending longitudinally in spaced relation through the space between said cathode cylinders.

4. A device for logging bore holes while drilling comprising a pipe section adapted to be connected in the drill pipe string, said section being provided with an annular chamber, a cylindrical detector of natural penetrative radiation in said chamber, a recording device at the surface and means for connecting said detector electrically to said recording device.

5. Apparatus for continuously logging a bore hole while it is being drilled comprising a drill pipe string, a drill bit, a drill collar connecting said bit to the lower end of said string, said collar being provided with an annular chamber concentric with said collar, a detector of natural penetrative radiation in said chamber, said detector being cylindrical in shape, a receiving device at the surface and means for transmitting the output of said detector to said receiving device.

6. Apparatus for continuously logging a bore hole while it is being drilled comprising a drill pipe string, a drill bit, a drill collar connecting said bit to the lower end of said string, said collar being provided with an annular concentric chamber, and a detector of penetrative radiation in said chamber, said detector comprising a plurality of annular ring members disposed in separated, parallel relation and connected together to form a cathode, said ring members being provided with a plurality of series of aligned holes, and a wire extending through each series of holes, said wires being connected together to form an anode.

7. Apparatus for continuously logging a bore hole while it is being drilled comprising a drill pipe string, a drill bit, a drill collar connecting said bit to the lower end of said string, said collar being provided with an annular concentric chamber, and a detector of penetrative radiation in said chamber, said detector comprising a housing, a pair of separated concentric cylindrical cathode members in said housing, and a plurality of anode wires extending longitudinally through the space between said cathode cylinders and disposed angularly around said space, a gas in said housing and means for applying a positive electrical potential to said anode wires, the arrangement being such that a gamma ray entering said housing will strike one of said cathode cylinders to eject an electron to ionize said gas and discharge the detector.

DONALD G. C. HARE.